United States Patent [19]

Kawamoto et al.

[11] Patent Number: 5,073,956
[45] Date of Patent: Dec. 17, 1991

[54] APPARATUS FOR CONVERTING IMAGE OUTLINE DATA INTO DOT DATA REPRESENTATIVE OF DOTS TO BE FORMED

[75] Inventors: Naoyuki Kawamoto, Toki; Hitoshi Yoshida, Kohnan; Takahiro Kanegae, Nagoya, all of Japan

[73] Assignee: Brother Kogyo Kabushiki Kaisha, Aichi, Japan

[21] Appl. No.: 425,604

[22] Filed: Oct. 23, 1989

[30] Foreign Application Priority Data

Oct. 25, 1988 [JP] Japan .............................. 63-269074
Mar. 29, 1989 [JP] Japan .............................. 1-78782

[51] Int. Cl.$^5$ ............................................. G06K 9/00
[52] U.S. Cl. ........................................ 382/22; 382/13;
382/23; 382/56; 358/261.1; 358/426
[58] Field of Search ............... 358/261.1, 426; 382/13, 382/22, 23, 56

[56] References Cited

U.S. PATENT DOCUMENTS 4,673,977 6/1985 Stelzenmuller ...................... 358/133
4,727,588 2/1988 Fox et al. ............................. 382/13
4,771,474 9/1988 Takashima et al. ................... 382/56
4,837,847 6/1989 Shirasaka et al. .................... 382/55

Primary Examiner—David K. Moore
Assistant Examiner—Daniel Santos
Attorney, Agent, or Firm—Oliff & Berridge

[57] ABSTRACT

Apparatus including a device for calculating coordinate values of intersections between the image outline and parallel scanning lines which are superimposed on each other in a coordinate system, and a device for storing the calculated coordinate values such that the values for each scanning line are arranged in order of the magnitude of the values and adjacent two of the ordered values are paired as a pair of coordinate values. The apparatus further includes a device for preparing a batch of dot data indicative of the dots to be formed in corresponding picture elements positioned in the coordinate system. The dot data is prepared such that successive bits of the dot data corresponding to successive picture elements consisting of two picture elements represented by the above-indicated pair of coordinate values and at least one picture element between these two picture elements are set at one time such that each of the successive bits indicates a dot to be formed in the corresponding picture element.

9 Claims, 13 Drawing Sheets

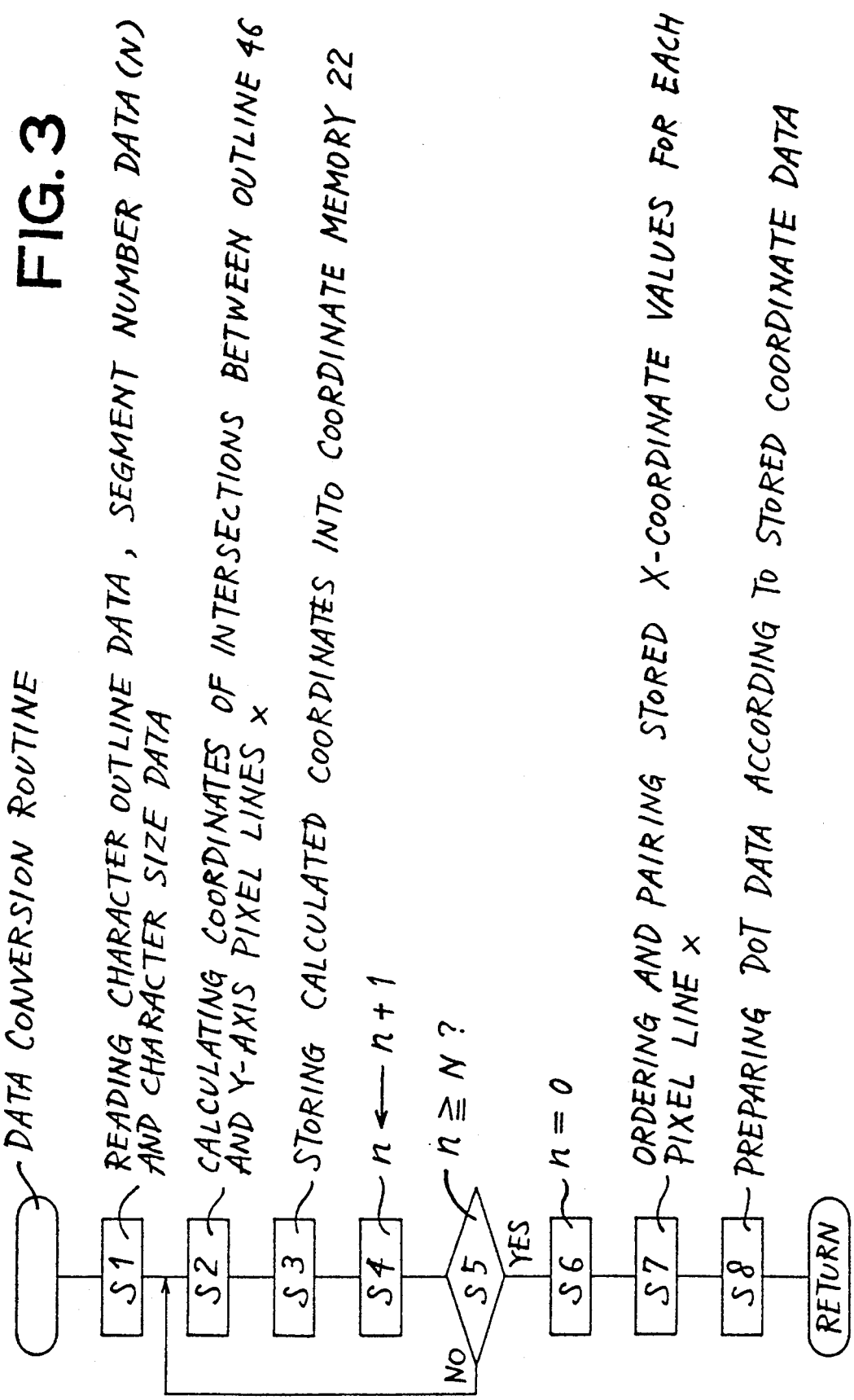

FIG. 13

| NO. OF PIXEL LINES X | NUMBER OF INTERSECTIONS | X-AXIS COORDINATE VALUES |
|---|---|---|
| 20 | 4 | 18, 13, 8, 3 |
| 19 | 4 | 18, 13, 8, 3 |
| 18 | 4 | 18, 13, 8, 3 |
| 17 | 4 | 16, 15, 6, 5 |
| 16 | 4 | 16, 15, 6, 5 |
| 15 | 4 | 16, 15, 6, 5 |
| 14 | 4 | 16, 5 |

FIG. 19

| NO. OF PIXEL LINES x | NUMBER OF INTERSECTIONS | X-COORDINATE VALUES |
|---|---|---|
| 0 | | |
| 1 | 4 | 1, 12, 12, 1 |
| 2 | 4 | 4, 9, 10, 3 |
| 3 | | |
| 4 | | |
| 5 | | |
| ... | | |

FIG. 20

| NO. OF PIXEL LINES y | NUMBER OF INTERSECTIONS | Y-COORDINATE VALUES |
|---|---|---|
| 0 | | |
| 1 | 2 | 1, 1 |
| 2 | 2 | 2, 1 |
| 3 | 2 | 2, 2 |
| 4 | 2 | 2, 2 |
| 5 | 2 | 3, 2 |
| 6 | 2 | 3, 2 |
| 7 | 2 | 3, 2 |
| 8 | 2 | 3, 2 |
| 9 | 2 | 2, 2 |
| 10 | 2 | 2, 2 |
| 11 | 2 | 2, 1 |
| 12 | 2 | 1, 1 |
| ⋮ | | |

APPARATUS FOR CONVERTING IMAGE OUTLINE DATA INTO DOT DATA REPRESENTATIVE OF DOTS TO BE FORMED

BACKGROUND OF THE INVENTION

1. Field of the Invention

The present invention relates in general to an apparatus for converting outline data representative of an outline of an image such as a letter, a symbol and a graphical representation, into dot data representative of dots to be formed to reproduce the image. More particularly, the present invention is concerned with improvements in such a data converting apparatus.

2. Discussion of the Prior Art

Images such as characters including letters and symbols represented by image data are printed, displayed or otherwise reproduced according to the image data suitably processed by a computer. Commonly, the image data takes the form of dot data indicating whether a dot should be formed in each of picture elements which are the smallest part of picture image and which determine the resolution of the reproduced image. If a batch of dot data representative of all the images available for reproduction is prepared and stored in an image data memory such as a character data memory, the memory should have an extremely large storage capacity. It is therefore desirable to store a batch of outline data representative of the outlines of the images such as the characters, and convert the outline data into the corresponding dot data by suitable data converting means, when the images are printed, displayed or otherwise reproduced, as disclosed in Japanese Patent Publication No. 53-41017.

In the data converting means disclosed in the above publication, the outline data is defined in a coordinate system in which picture elements are defined by a plurality of parallel scanning lines parallel to one of the X and Y axes. For example each stoke of a character is defined by the picture elements (referred to as "outlining picture elements") within which are located intersections between the character outline and each scanning line. The bits of the dot data corresponding to these outlining picture elements are all set so as to indicate the dots to be formed in the corresponding outlining picture elements. These bits are referred to as "dot-forming bits". Then, the bits of the dot data corresponding to the picture elements (referred to as "internal picture elements") which are surrounded by the outline defined by the outlining picture elements are all set as the dot-forming bits.

This known data converting apparatus is thus adapted to implement two steps for preparing a necessary batch of dot data, i.e., a first step for obtaining the dot-forming bits for the outlining picture elements, and a second step for the dot-forming bits for the internal picture elements. Moreover, the known apparatus requires that the second step be conducted such that the logical value of the bits are set one after another for the individual internal picture elements. In other words, the apparatus requires determination for each of a large number of bits of dot data corresponding to a large number of outlining and internal picture elements arranged along each scanning line, in order to check if each bit is a dot-forming bit or not. The bits are set so as to indicate the absence of dots to be formed (i.e., the absence of any part of the character to be reproduced), until a first dot-forming bit for an outlining picture element is detected along the relevant scanning line. The bits between the detected first dot-forming bit and a second dot-forming bit for another outlining picture element are all set so as to indicate the dots to be formed, namely, set as the dot-forming bits for the internal picture elements. The bits following the detected second dot-forming bit for the second outlining picture element are set so as to indicate the absence of dots to be formed, until a third dot-forming bit for a third outlining picture element is detected along the relevant scanning line. The bits following the detected third dot-forming bit are also set as dot-forming bits for another group of internal picture elements. Therefore, the known data converting apparatus is not a sufficiently efficient apparatus, requiring a comparatively long data processing time for checking each of the bits for each scanning line, in order to determine whether the bit should be a dot-forming bit or not.

SUMMARY OF THE INVENTION

It is therefore a first object of the present invention to provide a data converting apparatus capable of efficiently converting outline data of an image into dot data.

A second object is to provide a data converting apparatus capable of conversion of outline data of an image having a relatively narrow portion, into dot data conforming with the outline of the image as exactly as possible.

The first object may be accomplished according to the principle of one aspect of this invention, which provides a data converting apparatus for converting a batch of outline data representative of an outline of an image such as a letter, a symbol and a graphical representation, into a batch of dot data which is indicative of whether a dot is to be formed in each of picture elements positioned in a coordinate system in which said outline data is defined, characterized by (a) coordinate calculating means for calculating coordinate values of intersections between the outline of the image in the coordinate system and a plurality of parallel scanning lines superimposed on the outline in the coordinate system; (b) coordinate storing means for storing the coordinate values calculated by the coordinate calculating means, such that the coordinate values for each of the scanning lines arc arranged in order of the magnitude of the values and adjacent two of the ordered values are paired as a pair of coordinate values; and (c) dot data preparing means for preparing a batch of dot data such that successive bits of the dot data corresponding to a plurality of successive picture elements which consist of two picture elements represented by the above-indicated pair of coordinate values and at least one picture element between the above-indicated two picture elements are set at one time such that each of the successive bits indicates a dot to be formed in the corresponding picture element.

The term "coordinate values of intersections between the outline of the image and the scanning lines" are interpreted to mean the coordinate values of the picture elements if the intersections are located at the respective picture elements, e.g., at the centers of the appropriate picture elements, or the coordinate values of the picture elements which are nearest to the relevant intersections if the intersections are not located at the picture elements.

The data converting apparatus of the present invention constructed as described above is adapted to convert the outline data into the corresponding bit data, directly based on the coordinate values of each pair of adjacent ordered values of the two intersections between the image outline and each scanning line, so that the successive bits of the dot data corresponding to all successive picture elements determined by the two picture elements represented by the above-indicated adjacent two ordered coordinate values for each scanning line are set at one time such that the successive bits cause formation of dots in the corresponding picture elements. This arrangement is contrary to the conventional arrangement in which a batch of dot data is prepared for the outlining picture elements which define the outline of the image, and then another batch of dot data is prepared for the internal picture elements within the image outline, based on the previously prepared dot data for the outlining picture elements. The coordinates calculated by the coordinate calculating means are stored in a suitable memory such that the coordinate values of the intersections are arranged from the smallest to the largest or vice versa and the ordered values are paired such that the two values of each pair are next to each other in terms of the magnitude of the values. Each pair of coordinate values for each scanning line determine successive picture elements which define a part of the image, such as a stroke of a character (e.g., define the width of the stroke). Therefore, the bits corresponding to these successive picture elements may be set as the dot-forming bits at one time.

Thus, the present arrangement permits the determination of the logical values of all bits corresponding to each scanning line, at one time, based on the stored coordinate values of the intersections, without having to check each of the bits for each scanning line so as to see if the bit should be "1" or "0" as required in the conventional apparatus. Accordingly, the present apparatus is capable of efficiently converting the outline data of an image into corresponding dot data, without requiring a complicated procedure.

The coordinate calculating means may be adapted to calculate, as the coordinate value of each of the intersections, a coordinate value of the center of one of the picture elements which is nearest to the relevant intersection, which center may be located either inside or outside the image outline.

The image represented by the outline data may have a narrow portion. For example, a character as the image may have a narrow stroke, or a stroke of a character may have a narrow end portion, whereby only one intersection between the image outline and a scanning line may be obtained. In this case, the conventional apparatus prepares the dot data such that dot-forming bits are set for the picture elements between the obtained one intersection and another intersection between the outline of another portion of the image (e.g., another stroke of a character) and the relevant scanning line. The thus prepared dot data results in reproducing the image whose outline is different from the nominal outline represented by the original outline data. To avoid this, the outline of each image should be carefully designed.

According to one preferred arrangement of the present invention, where only one intersection is obtained by the coordinate calculating means, the coordinate storing means may be adapted such that the coordinate value of the above-indicated one intersection is stored at different locations of the appropriate memory, as a pair of coordinate values which define the width of the image or width of the relevant portion of the image. Accordingly, dot-forming bits are set for the picture elements which define the interior of the image outline, whereby the conventionally experienced erroneous setting of the dot data may be avoided. Thus, the second object of the invention may be attained according to the above arrangement which assures exact reproduction of the image represented by the outline data.

In some situations, there is no intersection between the image outline and a scanning line. For example, if the width of two segments of the outline is so small that the image or a portion of the image (a stroke of a character) is interposed between the adjacent two scanning lines, the coordinate calculating means cannot find the coordinate value of any intersection. This means the absence of any part of the image, in spite of the fact that the relevant scanning line intersects the image. In this case, any dot-forming bits are set to form dots which should be formed to define the relevant part of the image, whereby the reproduced image is discontinuous due to the absence of the dots at the relevant portion of the image. Thus, the reproduced image is different from the original image represented by the outline data.

This inconvenience may be overcome according to the principle of the second aspect of the present invention, which provides a data converting apparatus for converting a batch of outline data representative of an outline of an image such as a letter, a symbol and a graphical representation, into a batch of dot data indicative of whether a dot is to be formed in each of picture elements positioned in a coordinate system in which the outline data is defined, the apparatus being characterized by: (a) first coordinate calculating means for calculating coordinate values of intersections between the outline of the image in the coordinate system and a plurality of first parallel scanning lines superimposed on the outline in the coordinate system; (b) first coordinate storing means for storing the coordinate values calculated by the first coordinate calculating means, such that the coordinate values for each of the first scanning lines are arranged in order of the magnitude of the values and adjacent two of the ordered values are paired as a pair of coordinate values; (c) first dot data preparing means for preparing a first batch of dot data such that successive bits of the dot data corresponding to a plurality of successive picture elements which consist of two picture elements represented by the above-indicated pair of coordinate values and at least one picture element between the two picture elements are set at one time such that each of the successive bits indicates a dot to be formed in the corresponding picture element; (d) second coordinate calculating means for calculating coordinate values of intersections between the outline of the image in the coordinate system and a plurality of parallel second scanning lines which are superimposed on the outline in the coordinate system and which intersect the first scanning lines; (e) second coordinate storing means is provided for storing the coordinate values calculated by the second coordinate calculating means, such that the coordinate values for each of the second scanning lines are arranged in order of the magnitude of the values and adjacent two of the ordered values for the each second scanning line are paired as a pair of coordinate values; (f) second dot data preparing means for preparing a second batch of dot data such that successive bits of the dot data corresponding to a plurality of picture elements which consist of two picture elements represented by the above-indicated pair of coordinate values for each second scanning line and at least one picture element between the two picture elements represented by the above-indicated pair of coordinate values for each second scanning line are set at one time such that each of the successive bits of the second batch of dot data indicates a dot to be formed in the corresponding picture element; and (g) combined data preparing means for preparing a batch of combined dot data by combining the first batch of dot data prepared by the first dot data preparing means and the second batch of dot data prepared by the second dot data preparing means.

According to the data converting apparatus constructed as described above, the coordinate values of intersections between the image outline and the first scanning lines, and those of intersections between the image outline and the second scanning lines intersecting the first scanning lines are calculated by the respective first and second coordinate calculating means. In this arrangement, even if the image outline or a part of the image outline is located between the adjacent two first scanning lines, for example, at least one of the adjacent two second scanning lines intersects the image outline or the part of the outline, whereby intersections are obtained for the second scanning lines. Accordingly, by preparing combined dot data by combining the first batch of dot data prepared from the coordinate values associated with the first scanning lines, and the second batch of dot data prepared from the coordinate values associated with the second scanning lines, the image represented by the combined dot data is reproduced continuously, since the picture elements which are left blank according to the erroneously set bits of the first batch of dot data are filled by the dots formed according to the corresponding bits of the second batch of dot data. Hence, the combined dot data assures reproduction of the image without discontinuity due to the absence of intersections between the image outline and one of the first and second scanning lines.

BRIEF DESCRIPTION OF THE DRAWINGS

The above and optional objects, features and advantages of the present invention will become more apparent by reading the following detailed description of presently preferred embodiments of the invention, when considered in connection with the accompanying drawings in which:

FIG. 3 is a flow chart illustrating a data conversion routine as one of control programs stored in a PROGRAM ROM of the control circuit;

FIG. 13 is a view indicating the x-axis coordinate values of the intersections of FIG. 12 corresponding to the x-axis pixel lines;

FIG. 19 is a view corresponding to FIG. 13, indicating the x-axis coordinate values of the intersections between the x-axis pixel lines and the outline of the arcuate stroke of FIG. 18;

FIG. 20 is a view indicating the y-axis coordinate values of the intersections between the y-axis pixel lines and the outline of the arcuate stroke of FIG. 18.

DETAILED DESCRIPTION OF THE PREFERRED EMBODIMENTS

Figure 1:
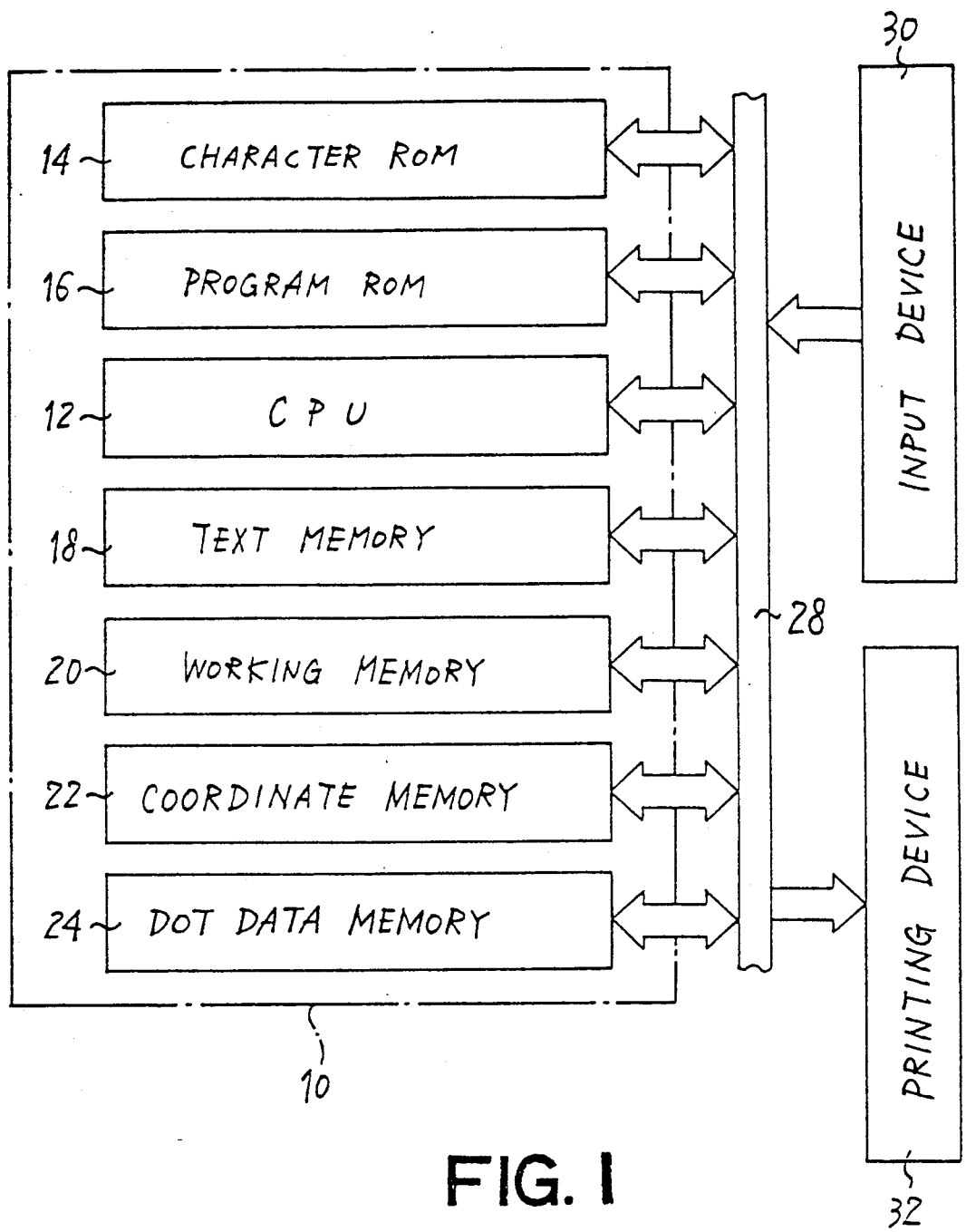
FIG. 1 is a schematic block diagram showing a control circuit of a laser printer which incorporates one embodiment of a data converting apparatus of the present invention.
Figure 2:
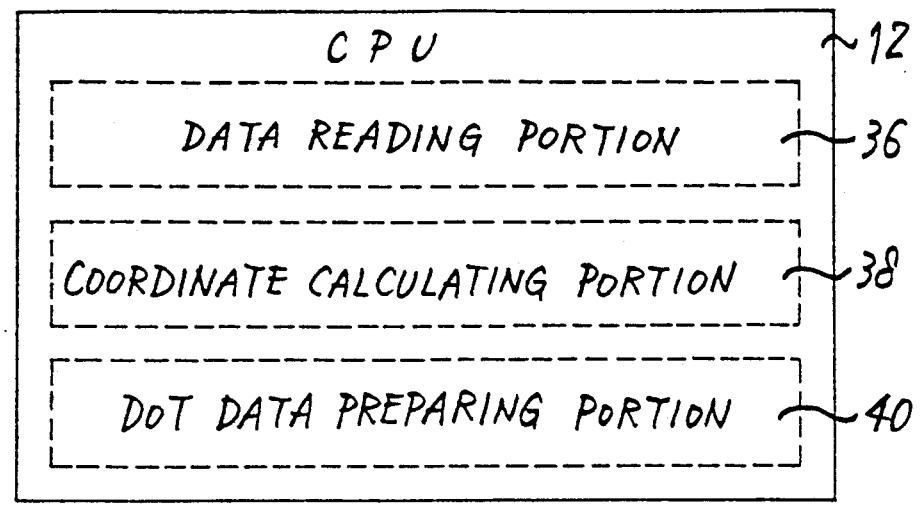
FIG. 2 is a schematic view of a central processing unit of the control circuit of FIG. 1.

Referring to FIGS. 1 and 2, there is illustrated a data converting apparatus constructed according to one embodiment of the present invention for converting outline data into dot data for printing in a laser printer, in which printing on a recording medium is effected by exposing the medium surface to a laser beam controlled according to the dot data.

The schematic block diagram of FIG. 1 shows a portion of a control circuit of the laser printer, which relates to data conversion according to the principle of the invention. The control circuit is principally constituted by a microcomputer 10, which includes a CPU (central processing unit) 12, a CHARACTER ROM (read-only memory) 14, a PROGRAM ROM (read-only memory) 16, a TEXT memory 18, a WORKING memory 20, a COORDINATE memory 22 and a DOT DATA memory 24. These elements of the microcomputer 10 such as the CPU 12 are interconnected to each other through a bus 28. To the bus 28, there are connected a data input device 30 and a printing device 32. The input device 30 is provided to load the microcomputer 10 with necessary data for printing, while the printing device 32 is constructed to effect laser printing according to commands and signals supplied from the microcomputer 10. The present laser printer has an image resolution of 300 dots per inch.

As schematically indicated in FIG. 2, the CPU 12 has a data reading portion 36, a coordinate calculating portion 38, and a dot data preparing portion 40. The coordinates calculating portion 38 operates to calculate coordinates of intersections between an outline of an image in the form of a character, and x-axis pixel lines x of a coordinated pixel screen (which will be described). The dot data preparing portion 40 operates to prepare dot data representative of the character, which dot data corresponds to the outline of the character. The TEXT memory 18 stores a batch of character data in the form of code data indicative of a text entered through the input device 30, and the WORKING memory 20 stores data necessary for the microcomputer 10 to execute various control programs stored in the PROGRAM memory 16. The COORDINATE memory 22 stores the coordinate data calculated by the coordinate calculating portion 38, and the DOT DATA memory 24 stores the dot data prepared by the dot data preparing portion 40.

Figure 4:
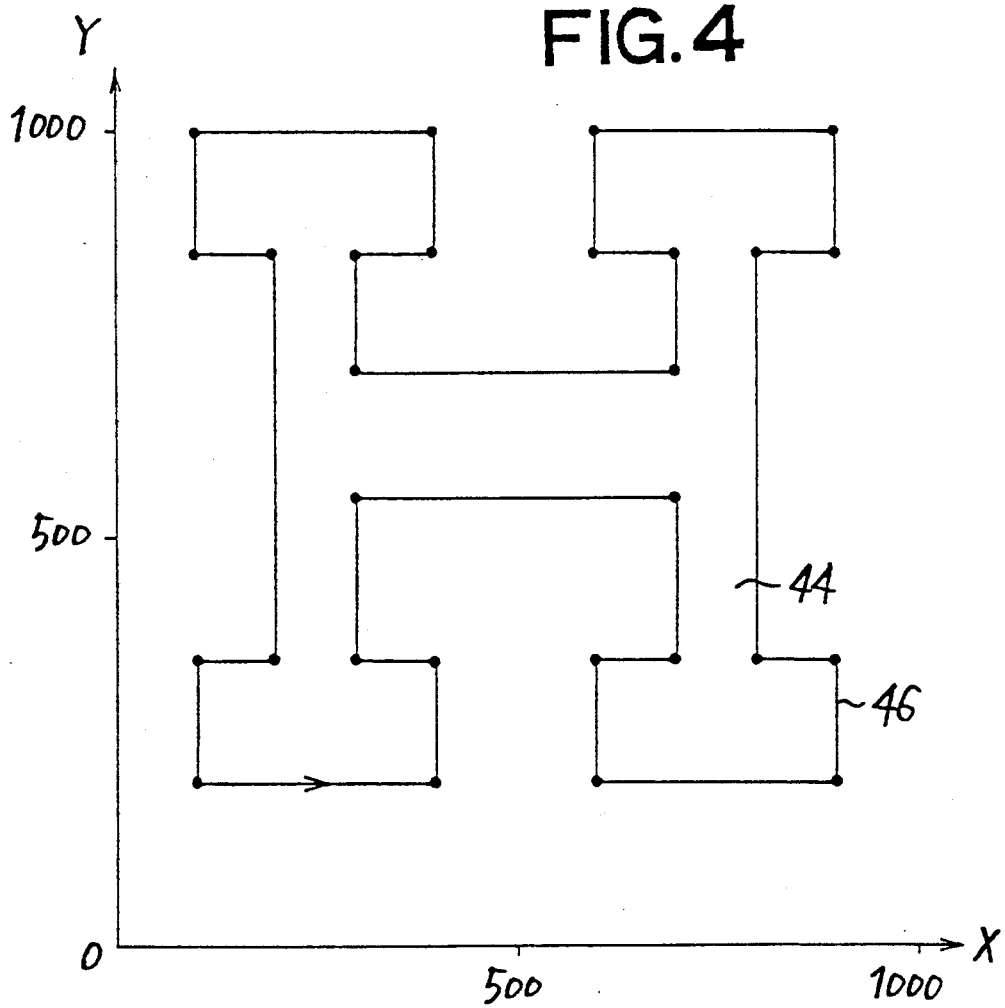
FIG. 4 is a view showing an outline of the letter "H" whose outline data is converted into dot data by the data conversion apparatus according to the conversion routine of FIG. 3.

The CHARACTER ROM 14 stores multiple batches of outline data representative of the outlines of multiple characters such as alphabetic and other letters and symbols, and any other images. The outline of each image such as a character is defined in an X-Y coordinate system having 1000 Y-axis positions taken along the Y axis, and 1000 X-axis positions taken along the X axis perpendicular to the Y axis, as indicated in FIG. 4. For example, the upper case of all alphabetic letters are placed between the 200th and 1000th Y-axis positions, while the entire range of the Y-axis are used for the lower case (namely, the 0th to 200th Y-axis positions are also used for the lowercases). When the configuration of each character is designed in the X-Y coordinate system indicated above, the profile of each stroke 44 of the character having a predetermined width is defined by a surrounding outline 46. The outline data of each character consists of a plurality of sets of segment data which represent respective segments of the outline 46. Each segment is defined by two black points, as indicated in FIG. 4 in the case of the letter "H" by way of example. The two points indicate the beginning and the end of the relevant segment. Each set of segment data includes coordinate data representative of coordinates of the beginning and end of the segment. The coordinate data of the points defining the segments of the outline 46 are stored in the CHARACTER ROM 14, in the predetermined order, in the predetermined direction along the outline 46, as indicted by an arrow in FIG. 4. One of the two points defining each segment of the outline 46, whose coordinate data is stored preceding that of the other, is defined as the beginning of the relevant segment, while the other point is defined as the end of the segment. The segment data for a straight segment includes segment-designating data indicative of the straight segment, and coordinate data representative of the coordinates of the beginning and end points of the segment. The segment data for a curved segment includes segment-designating data indicative of the curved segment, function data indicative of a curvature of the segment, and coordinate data representative of the coordinates of the beginning and end points and an auxiliary point. The segment data for a circular arc segment includes segment-designating data indicative of the arc segment, and coordinate data representative of the coordinates of the beginning and end points and an arc center of the segment. The CHARACTER ROM 14 also stores data indicative of the number of the segments of each character.

Figure 5:
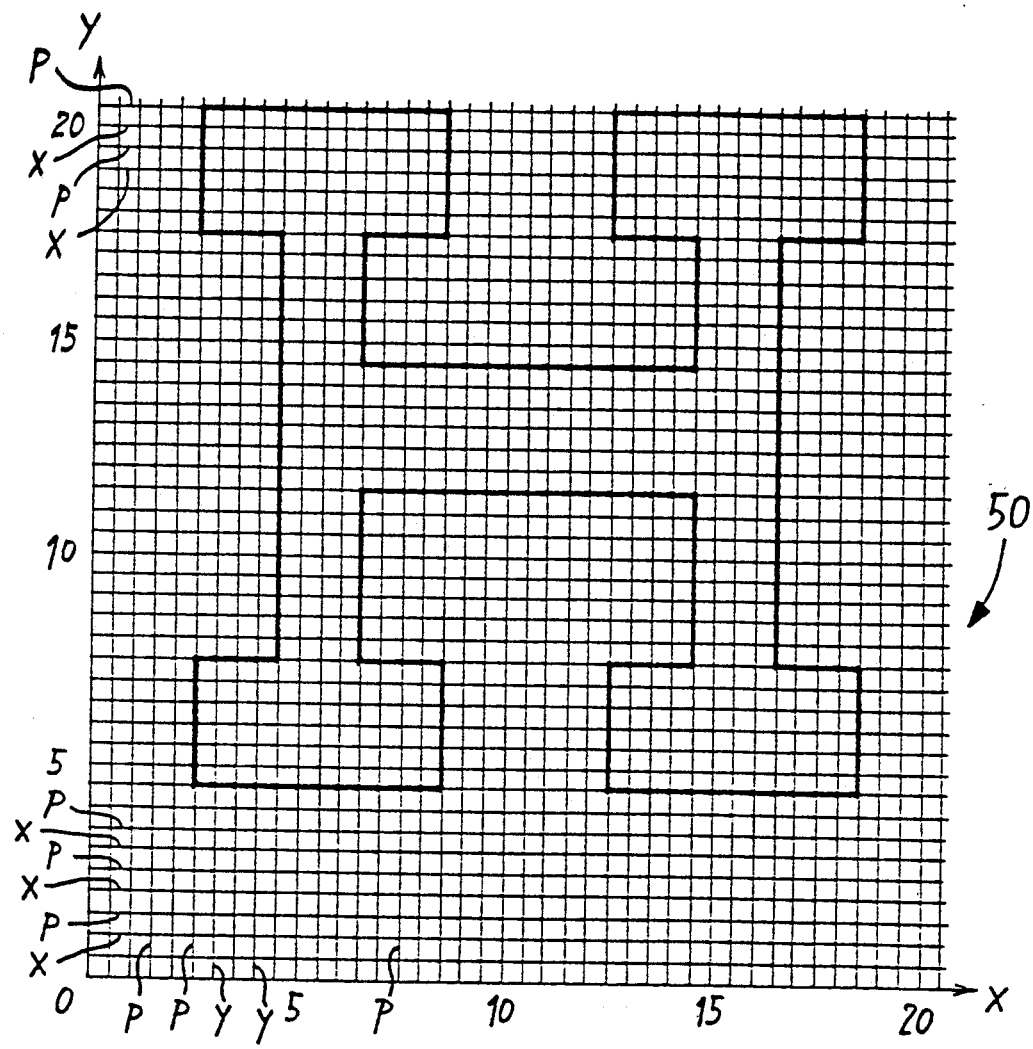
FIG. 5 is a view showing a part of a coordinated pixel screen on which the outline of the letter "H" is superimposed.

In the present laser printer constructed as described above, the conversion of the outline data of each image such as a character into a corresponding batch of dot data is effected by use of a two-dimensional coordinated pixel screen 50 as shown in FIG. 5, on which the outline 46 of the image is superimposed for calculating the dot data, according to the outline data. The pixel screen 50 consists of a multiplicity of picture elements, which are the smallest parts of a printed picture image available on the laser printer. The picture elements are defined by equally spaced-apart x-axis partition lines p parallel to the X-axis of the screen 50, and equally spaced-apart y-axis partition lines p which are parallel to the Y-axis of the screen and perpendicular to the x-axis partition lines p. Thus, the picture elements used in the present embodiment are square in shape. Dot data corresponding to each picture element indicates whether a dot is printed at the corresponding picture element or not. As also shown in FIG. 5, there are provided multiple x-axis pixel lines x which extend parallel to the X-axis and are positioned intermediate between the adjacent x-axis partition lines p, and multiple y-axis pixel lines y which extend parallel to the Y-axis and are positioned intermediate between the adjacent y-axis partition lines p. Each x-axis pixel line x passes the centers of the picture elements in a corresponding row parallel to the X-axis, while each y-axis pixel line y passes the centers of the picture elements in a corresponding column parallel to the Y-axis. The position of each picture element is indicated by the coordinates of its center (pixel center), i.e., one of the x-axis pixel lines x and one of the y-axis pixel lines y. The picture elements may have rectangular or other shapes.

The coordinate pixel screen 50 corresponds to a printing area of a recording medium within which laser printing is effected according to appropriate batches of dot data. In this respect, it is noted that FIG. 5 shows a portion of the coordinated pixel screen 50 in which only the letter "H" of the images to be printed in the printing area is indicated, in the interest of brevity and simplification. The x-axis and y-axis pixel lines x and y are numbered over the entire area of the screen 52. It will be understood that the picture elements of the other characters not shown in FIG. 5 are represented by the x-axis and y-axis pixel lines x, y which are appropriately numbered, the numbers identifying these pixel lines x, y being larger than those indicated in FIG. 5 for the letter "H".

The conversion of the outline data into the corresponding dot data is effected with the outline of the character superimposed on the coordinated pixel screen 50, so that a dot is formed at each picture element of the screen 50 which lies within the area defined by the outline of the character (this area being hereinafter simply called "outline of the character"). In this embodiment, the logical value of the dot data corresponding to the picture element in which a dot is to be formed is "1". It will be understood that some picture elements lie entirely within the outline of the character, while some picture elements lie partially within the outline. The specific manner of converting the outline data into the dot data will be described in greater detail.

The present laser printer is capable of printing characters in a selected one of different sizes, namely, 4.8 point, 10 point, 12 point, 20 point, 24 point and 30 point, by way of example. According to the selected character size, the coordinates of the points defining the outline of the character in the 1000×1000 coordinate system of FIG. 4 are converted into the corresponding coordinate values on the coordinated pixel screen 50 of FIG. 5 in which each square picture element is dimensioned as 1×1. If a character of B point size is formed by a C×C matrix of picture elements (dots), the coordinate values of a point on the pixel screen 50 are obtained by multiplying the coordinate values of the corresponding point on the character outline in the 1000×1000 coordinate system, by C/1000. In this example, the character size is 4.8 point, and each character is formed by a 20×20 matrix of picture elements or dots. The numbers 0 through 20 given on the pixel screen 50 in FIG. 5 to identify the x-axis and y-axis pixel lines x, y represent the coordinate values on the screen 50 in the present example. To superimpose the outline of each character on the pixel screen 50, the coordinate values of the reference point of the character on the screen 50 are determined, based on the printing position data. Accordingly to the determined coordinates of the reference point as well as the calculated coordinates of the character outline, the character is positioned on the pixel screen 50 of FIG. 5.

The PROGRAM ROM 16 stores various control programs necessary for printing, such as a data conversion routine as illustrated in the flow chart of FIG. 3. There will be described an operation to convert the outline data for the letter "H" into the corresponding dot data by reference to the flow chart of FIG. 3, by way of example. Since the printing according to the dot data is not essential to the understanding of the principle of the present invention, no detailed description on the manner of printing will be provided. Briefly, a text stored in the TEXT memory 18 is printed one page after another. Each time a page is printed, character data corresponding to that page of the text is retrieved from the TEXT memory 18, and a batch of outline data (stored in the CHARACTER ROM 14) corresponding to that page is converted into a corresponding batch of dot data.

Initially, step S1 is executed to read out the outline data, data indicative of the number of segments of the character outline, and data indicative of the character size selected. Then, the control flow goes to step S2 in which the coordinate calculating portion 38 of the CPU 12 calculates the coordinates of intersections between the character outline 46 and each x-axis pixel line x on the pixel screen 50, for each segment of the letter character "H". There will be described a rule on which the x-axis coordinate values of these intersections are determined, with reference to FIGS. 6 through 11.

Figure 6:
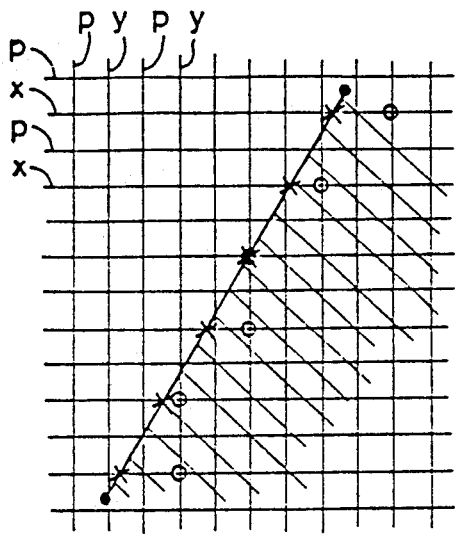
FIGS. 6, 7, 8, 9, 10 and 11 are illustrations explaining different manners of determining intersections between x-axis pixel lines, and segments of the character outline which are is converted into dot data by the data converting apparatus.

FIG. 6 shows a straight segment which intersects both of the x-axis pixel lines x and the y-axis pixel lines y. This straight segment intersects a plurality of x-axis pixel lines x, at respective positions indicated by "x" marks between the beginning and the end of the relevant segment. The x-axis coordinates to be stored in the COORDINATE memory 22 are not those of the intersections between the x-axis pixel lines x and the relevant segment, but are the x-axis coordinates of the centers (indicated by "o" marks in FIG. 6) of the picture elements which lie inside the area (indicated by hatched lines in the figure) defined by the segment and which are nearest to the segment along the x-axis (i.e., nearest to the intersections between the x-axis pixel lines x and the relevant segment). If an intersection between an x-axis pixel line x and the segment lies right on the center of a picture element, the x-axis coordinate of that pixel center is stored as the x-axis coordinate value.

Figure 9:
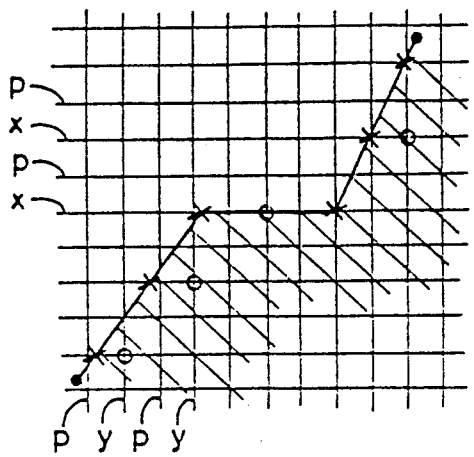
Figure 7:
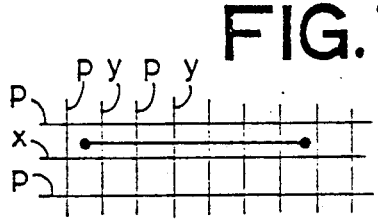
Figure 10:
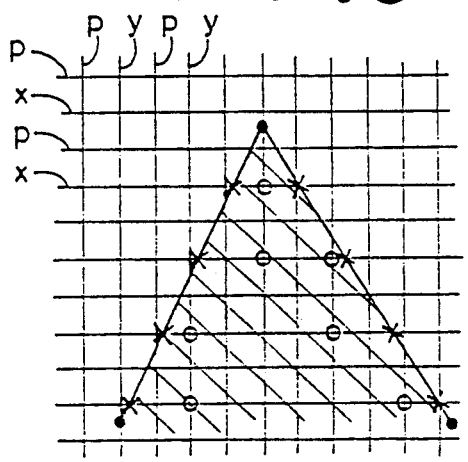
Figure 8:
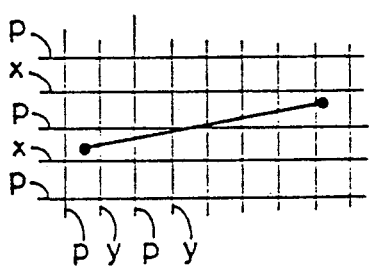

A straight segment parallel to the x-axis pixel lines x is shown in FIG. 7. A straight segment shown in FIG. 8 is located between the adjacent two x-axis pixel lines x, and the length of the segment and the angle of inclination with respect to the x-axis pixel lines x are small enough to prevent the segment from intersecting any x-axis pixel lines x. In these cases of FIGS. 7 and 8, the COORDINATE memory 22 stores data which indicates that the relevant segment has no intersections with the x-axis pixel lines x. FIG. 9 shows a combination of three connected straight segments, the intermediate segment lying on one of the x-axis pixel lines x, while the other two segments being inclined with respect to the pixel lines x and connected to the opposite ends of the intermediate segment. In this case, the intermediate segment has no intersections. Further, the coordinates for one of the two outermost intersections of each of the two inclined segments are not stored in the COORDINATE memory 22. That is, the coordinate values are obtained for only one of the two outermost intersections whose x-axis coordinate value is smaller than that of the other (which is located to the left of the other in the x-axis direction in FIG. 9). Referring to FIG. 10, there is shown a relatively narrow end portion of a stroke of a character, which is defined by two intersecting inclined straight segments. These two segments intersect each other such that there exists only one picture element whose center is located inside the area defined by the two segments, with the center lying on the x-axis pixel line x adjacent to the point of intersection. In this case, the x-axis coordinate value of the center of the picture element indicated above is stored as the x-axis coordinate value of the intersection of each of the two inclined straight lines. In other words, the same intersection on the same x-axis pixel line x is obtained for each of the two intersecting inclined segments, at the same terminal portions on the side of the point of intersection of these two segments. In this case, therefore, the same x-axis coordinate value is stored as the x-axis coordinate values of the points at which the two segments intersect the x-axis pixel line x adjacent to the intersection of the two segments.

Figure 11:
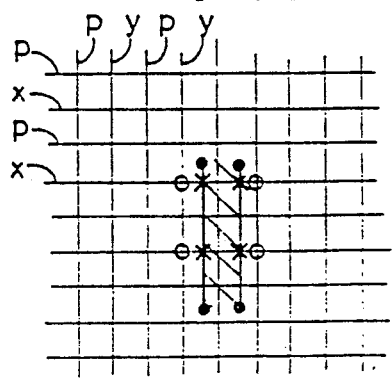

In the case of FIG. 11, the spacing between two straight segments parallel to the y-axis pixel lines y is small, and there exist no picture elements whose centers are located between the two segments. In this case, too, the same x-axis coordinate values are used for the two segments. Described specifically, the COORDINATE memory 22 stores, as the x-axis coordinate values of the intersections for the two segments, the x-axis coordinate values of the centers of the picture elements which are adjacent in the x-axis direction to the area defined by the two segments and which are positioned on one of opposite sides of that area on which the x-axis coordinate values are larger. If the centers of any picture elements lie within the area defined by the two segments, the x-axis coordinate values of those centers are stored as the x-axis coordinate values of the intersections between the x-axis pixel lines x and the two segments.

Figure 12:
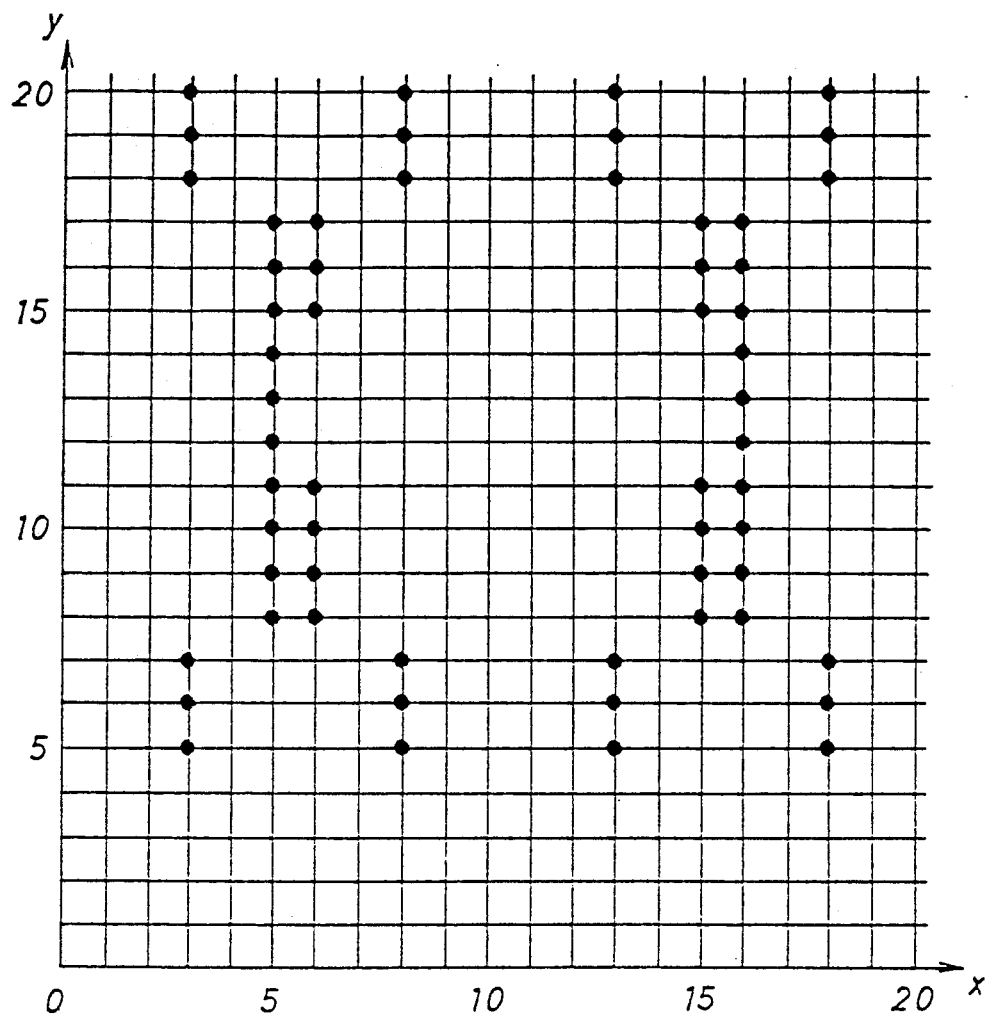
FIG. 12 is a view showing the positions on the pixel screen, of the intersections obtained for the letter "H" of FIG. 4.

The thus determined intersections between the x-axis pixel lines x and each segment of the outline 46 of the letter "H" are indicated by black dots in FIG. 12. The x-axis coordinate values of these intersections are stored in the COORDINATE memory 22, in step S3 of the flow chart of FIG. 3. In the present embodiment, there are a total of 20 x-axis pixel lines x for each character, and therefore a total of 20 y-axis coordinate values of the 20 x-axis pixel lines x. The x-axis coordinate value of each intersection of each x-axis pixel line x is stored in combination with the appropriate y-axis coordinate value, which indicates the number of the relevant x-axis pixel line x. The coordinate data for each x-axis pixel line x is preceded by data indicative of the number of the intersections between that pixel line x and the character outline 46. FIG. 13 indicates the numbers of the intersections and the coordinate values for some of the pixel lines x intersecting the outline 46 of the letter "H".

Then, the control flow goes to step S4 to increment the count n of a counter which counts the number of the segments of the character outline 46 which have been processed. Step S4 is followed by step S5 to determine whether the count n is equal to a value N, which represents the number of the segments of the outline 46 of the relevant character. Namely, step S5 is implemented to determine whether the x-axis coordinates of the intersections associated with all the segments of the character outline 46 have been calculated by the coordinate calculating portion 38 of the CPU 12, or not. If a negative decision (NO) is obtained in step S5, the control goes back to step S2, whereby steps S3–S5 are executed to calculate the x-axis coordinates associated with the next segment. Steps S2–S5, are repeatedly executed until the coordinates of the intersections of all the segments of the character outline 46 have been calculated and stored in the COORDINATE memory 22. If the count n has been incremented to N, an affirmative decision (YES) is obtained in step S5, and step S6 is implemented to reset the counter to zero.

Step S6 is followed by step S7 in which the x-axis coordinate values are ordered from the smallest to the largest, for each x-axis pixel line x, and the successive two values are paired. The coordinate values are calculated in step S2 for each of the segments of the outline 46 which are processed in the predetermined order. In this respect, it is noted that a segment of the outline 46 may be processed before another segment whose x-axis coordinate values are smaller than those of that first processed segment. In view of this, step S7 is implemented. In the present laser printer, the two same x-axis coordinate values are stored for respective two segments of the character outline, even if only one or no intersection exists in a relatively narrow area defined by the relevant two segments, as discussed above by reference to FIGS. 10 and 11. Therefore, there are always an even number of intersections for each x-axis pixel line x which intersects the character outline, whereby each of the x-axis coordinate values of the adjacent two intersections can be paired. In preparing dot data corresponding to each x-axis pixel line x which intersects the character outline, the logical values of the dot data corresponding to the picture elements between the pair of two intersections are set to "1". In the present embodiment, the logical values of dot data corresponding to the picture elements corresponding to the pair of two intersections are also set to "1".

Figure 14:
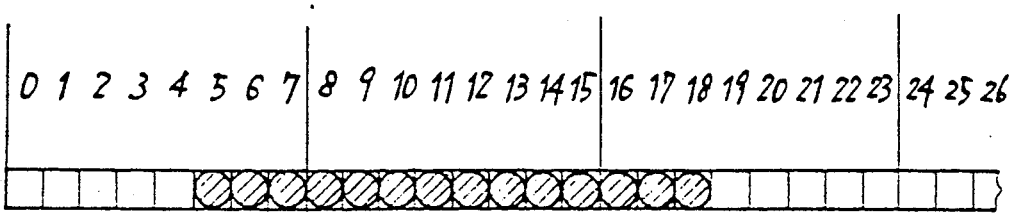
FIG. 14 is a view explaining the manner of preparing dot data according to the x-axis coordinate values of the intersections as indicated in FIG. 13.
Figure 15:
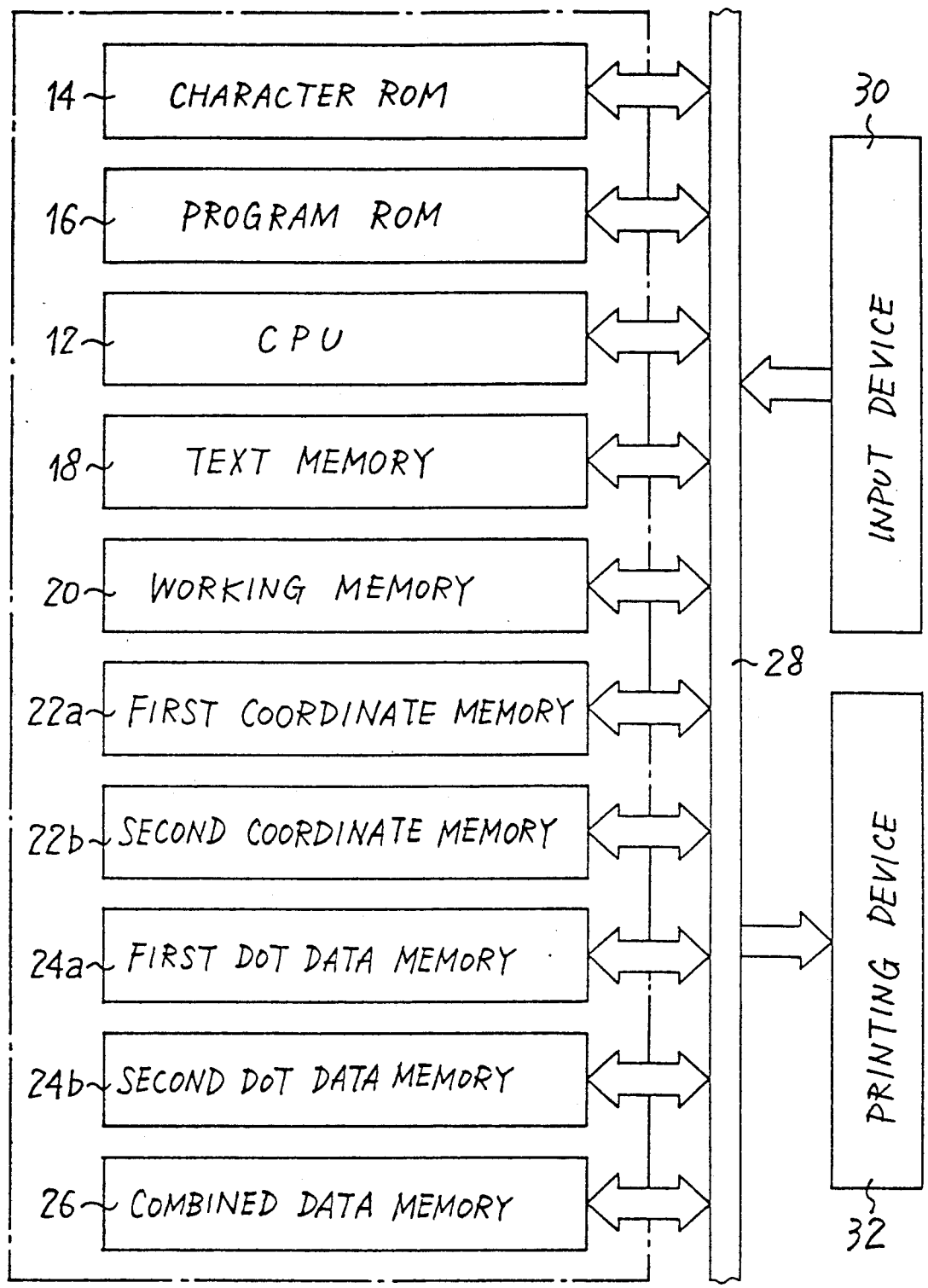
FIG. 15 is a schematic view corresponding to that of FIG. 1, showing a control circuit of a laser printer incorporating a second embodiment of the data converting apparatus of the invention.

After the x-axis coordinate values of the obtained intersections have been ordered and paired in step S7, the control flow goes to step S8 for preparing a batch of dot data corresponding to the coordinate data stored in the COORDINATE memory 22. The dot data is prepared one byte after another. The microcomputer 10 is capable of processing one byte of data at a time, namely, capable of preparing eight bits corresponding to respective eight picture elements at one time. Referring to FIG. 14, an example of dot data preparation will be described, in connection with a pair of x-axis coordinates (5, 18), which designate the positions of two picture elements along the x-axis on the coordinated pixel screen 50.

Initially, the number of picture elements whose dot data bits are set to "1" is calculated. Specifically, the two x-axis coordinate values "5" and "18" on an x-axis pixel line x defines a segment whose beginning point has the x-coordinate value "5" and whose end point has the x-coordinate value "18". The value "5" corresponding to the beginning point is subtracted from the value "18" corresponding to the end point, and "1" is added to the obtained difference "13". Then, the x-coordinate value "5" corresponding to the beginning point is subtracted from the x-coordinate value corresponding to the first bit of the next high-order byte with respect to the byte to which the bit corresponding to the beginning point (value "5") belongs. The picture elements along each x-axis pixel line x are numbered starting from "0", and the x-coordinate values are equal to the numbers of the corresponding picture elements. Therefore, the x-coordinate value corresponding to the first bit of the next high-order byte is a multiple of "8". In this case, the x-coordinate value "5" is subtracted from the x-coordinate value "8". The obtained difference "3" represents the number of the picture elements which belong to the first group of eight picture elements (0 through 7) corresponding to the first byte and whose x-coordinate values are equal to or larger than that of the picture element corresponding to the beginning point of the relevant segment. The bits corresponding to the thus determined three picture elements (5, 6, 7) are set to "1" at one time.

Then, the number of bytes corresponding to the remaining picture elements whose bits are set to "1" is calculated. Specifically, the x-coordinate value corresponding to the first bit of the lowest-order byte is subtracted from the x-coordinate value corresponding to the end point, and value "1" is added to the obtained difference. The obtained sum is divided by "8". In this example, value "8" is subtracted from value "18", and "1" is added to the difference "10". The sum "11" is divided by "8", whereby a quotient "1" is obtained, with a residue "3". This means that the remaining picture elements (8–18) includes eight picture elements (8–15) which corresponds to the next byte whose bits are all set to "1". Subsequently, the remaining three bits are set to "1". In this way, the dot data corresponding to the stored coordinate values for each x-axis pixel line x is prepared. Upon completion of the dot data preparation for all pixel lines x intersecting the character outline, the control flow goes back to the main routine.

As described above, the present laser printer is adapted such that the dot data for two or more picture elements corresponding to the width of a stroke of an image such as a character can be prepared at one time. That is, the dot data preparation in the present printer is effected one byte after another, such that up to eight bits are set at one time, unlike the conventional bit by bit preparation of dot data which requires determination of the logical value ("1" or "0") of each bit corresponding to each picture element. Accordingly, the dot data preparation in the present printer can be accomplished with considerably improved efficiency, with a comparatively high data processing speed.

Further, two sets of x-coordinate data are stored in the COORDINATE memory 22, even for a narrow stoke of a character which intersects the x-axis pixel line or lines x, so that the width of the stroke is defined by the two intersections represented by these two sets of data. Accordingly, the profiles of the characters can be easily designed, without taking cares to assure that there exist two intersections between the x-axis pixel lines x and the outline of each stroke of each character.

It will be understood from the foregoing explanation that the x-axis pixel lines x are used as parallel scanning lines to obtain points which define segments of the character outline 46, and that the portion of the PROGRAM ROM 16 for step S2, and the portion of the CPU 12 assigned to execute step S2, i.e., the coordinate calculating portion 38, cooperate to constitute means for calculating x-coordinate values of the intersections between each pixel line x and the character outline 46. It will also be understood that the COORDINATE memory 22, and the portions of the PROGRAM ROM 16 and CPU 12 which are assigned to execute steps S3 and S7 cooperate to constitute means for storing the calculated x-coordinate values, and that the portion of the PROGRAM ROM 16 for step S8, and the portion of the CPU 12 assigned to execute step S8, i.e., the dot data preparing portion 40, cooperate to constitute means for preparing dot data according to the x-coordinate values stored by the storing means.

While the x-axis pixel lines x are used as the scanning lines, the y-axis pixel lines y or other parallel straight lines may be used as the scanning lines.

Although the present embodiment is adapted such that two sets of x-coordinate data are stored even for narrow strokes of characters, so as to permit easy designing of the characters, it is possible to eliminate this function if the character data stored in the CHARACTER ROM 14 is prepared so that two intersections are obtained for all of the strokes of all characters.

Referring next to FIGS. 15–21, there will be described another embodiment of the present invention. For easy understanding and simplification, the same reference numerals as used in the preceding embodiment will be used in the present embodiment to identify the corresponding elements, and no redundant description of these elements will be provided.

Figure 17:
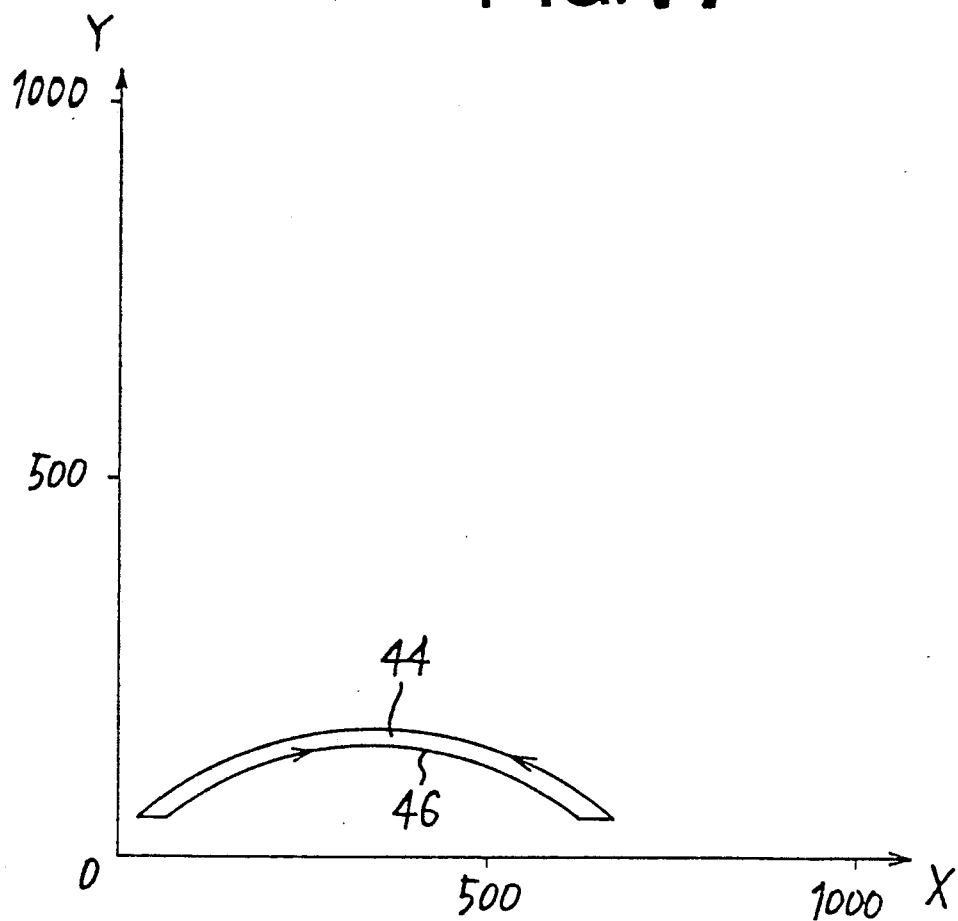
FIG. 17 is a view illustrating the outline of an arcuate stroke of a character, whose outline data is converted into dot data according to the data conversion routine of FIG. 16.

In this modified embodiment, the microcomputer 10 incorporates a first COORDINATE memory 22a and a second COORDINATE memory 22b, rather than the single COORDINATE memory 22 provided in the preceding embodiment. The first COORDINATE memory 22a stores x-coordinate data similar to that stored in the COORDINATE memory 22 of the preceding embodiment. The second COORDINATE memory 22b stores y-coordinate data representative of y-axis coordinates of intersections between the y-axis pixel lines y and an outline 46 defining an arcuate stroke 44 of a character, as indicated in FIG. 17 by way of example. The outline 46 is defined on the same X-Y coordinate system as described above referring to FIG. 4. The microcomputer 10 incorporates a first and a second DOT DATA memory 24a, 24b which correspond to the first and second COORDINATE memories 22a, 22b. The first DOT DATA memory 24a stores dot data prepared according to the x-coordinate data stored in the first COORDINATE memory 22a, while the second DOT DATA memory 24b stores dot data prepared according to the y-coordinate data stored in the second COORDINATE memory 22b. Unlike the microcomputer used in the preceding embodiment, the microcomputer 10 of the present embodiment has a COMBINED DATA memory 26 which stores dot data which is prepared from the batches of dot data stored in the two DOT DATA memories 24a, 24b, as described below.

Figure 18:
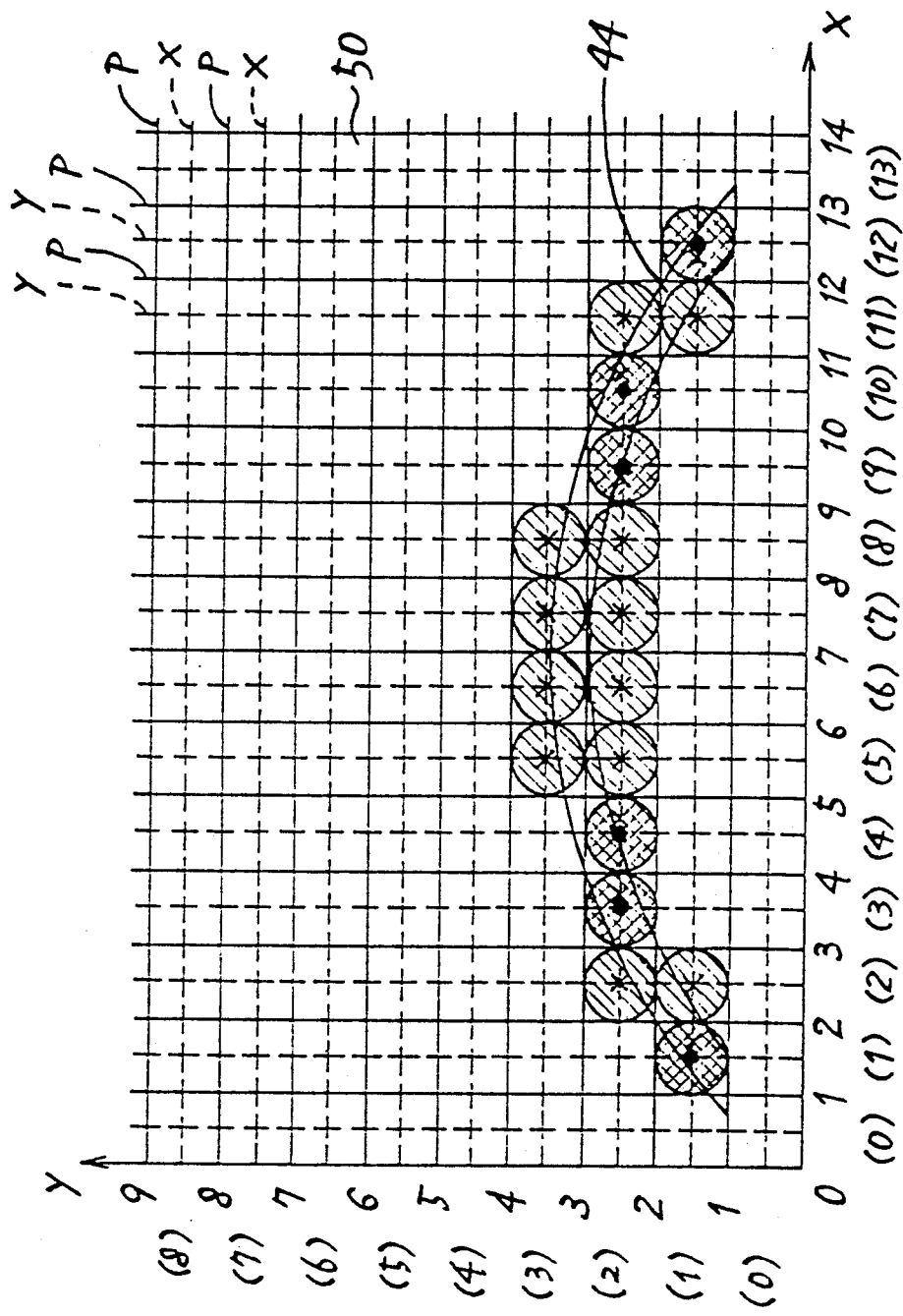
FIG. 18 is a view showing the arcuate stroke of FIG. 17 superimposed on the pixel screen.

There is shown in FIG. 18 the arcuate stroke 44 as superimposed on the coordinated pixel screen 50 on which are provided the x-axis and y-axis partition lines p and x-axis and y-axis pixel lines x, y in the case of the character size of 4.8 point where each character is defined by 20×20 picture elements, as described above with respect to the preceding embodiment. For easy understanding, the x-axis and y-axis partition lines p defining the picture elements are numbered in FIG. 18. Similarly, the x-axis and y-axis pixel lines x, y are numbered to identify the positions of the picture elements on the pixel screen 50. For instance, the x- and y-coordinates of a picture element defined by the two adjacent x-axis partition lines p numbered "3" and "4" and the two adjacent y-axis partition lines p numbered "2" and "3" are (3, 2) as represented by the x-axis pixel line x numbered "(3)" and the y-axis pixel line y numbered "(2)".

Figure 16:
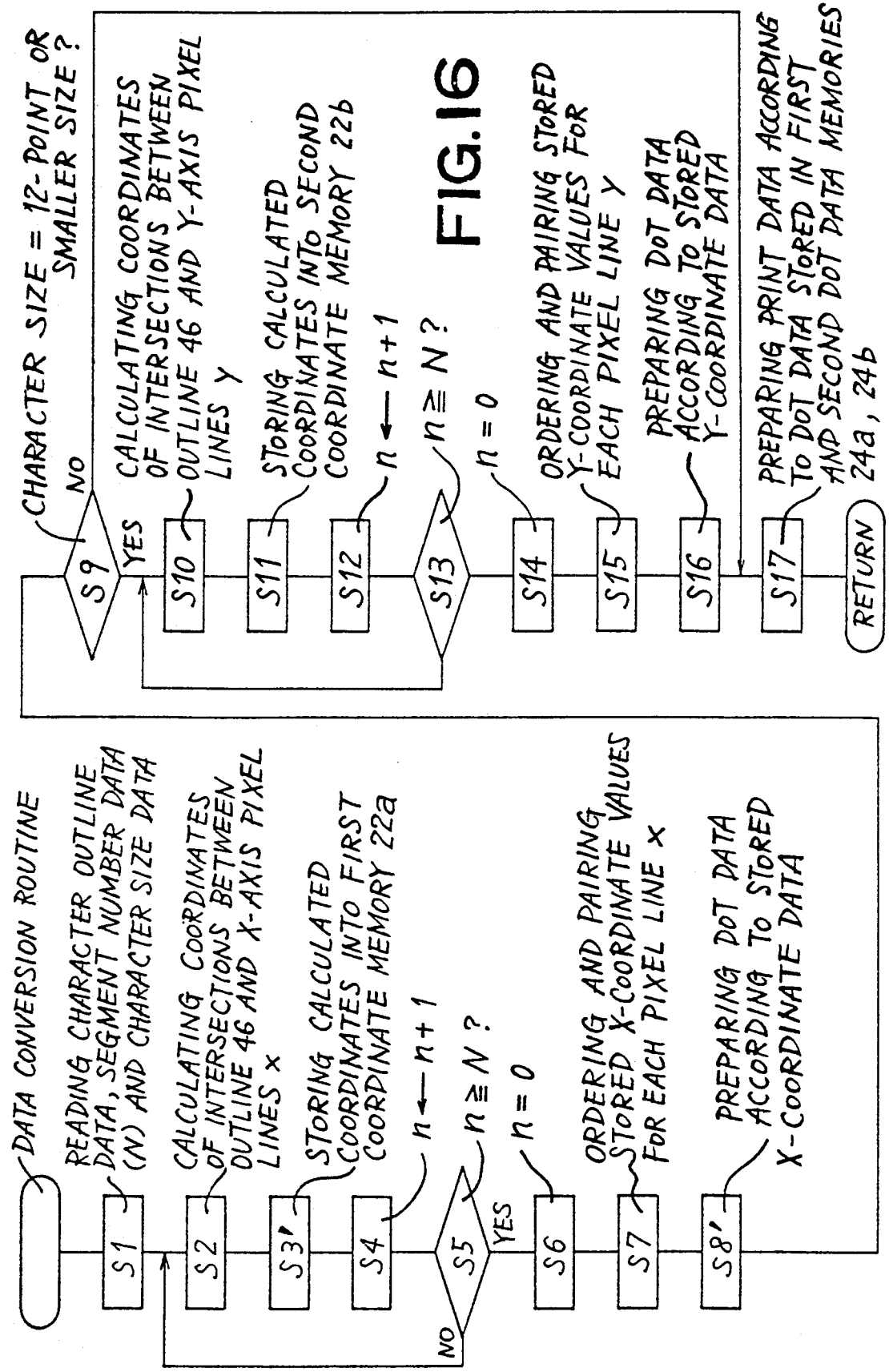
FIG. 16 is a flow chart illustrating a data conversion routine executed in the embodiment of FIG. 15.

Reference is now made to the flow chart of FIG. 16, which illustrates a routine for converting outline data of the arcuate stroke 44 of FIG. 18 into corresponding combined dot data. In this flow chart, steps S1, S2 and S4–S7 are similar to those in the flow chart of FIG. 3, and steps S3' and S8' are slightly modified from corresponding steps S3 and S8 of FIG. 3. Namely, the x-axis coordinate values of the intersections between each outline segment of the arcuate stroke 44 and the x-axis pixel lines x are first obtained in step S2. In this embodiment, however, the calculated x-axis coordinate values are stored in step S3' in the first COORDINATE memory 22a, and the dot data prepared according to the x-coordinate data stored in the first COORDINATE memory 22a is stored in step S8' in the first DOT DATA memory 24a.

In FIG. 18, black dots indicate the positions of the calculated intersections between the x-axis pixel lines x and the arcuate stroke 44, and each circle indicates a dot printed in a picture element. As indicated in FIG. 19, the x-coordinate values of the intersections of the stroke 44 are calculated and stored for each x-axis pixel line x which intersects any outline segment of the stroke 44. In steps S2 and S3' in the first control cycle, the x-coordinate values of the intersections between the lower arcuate outline segment (as seen in FIG. 18) of the stroke 44 and the x-axis pixel lines x are calculated and stored. Then, the count n is incremented in step S4, and steps S2 and S3' are again executed to calculate and store the x-coordinates of the intersections between the right-hand side (as seen in FIG. 18) short straight outline segment of the stroke 44 and the x-axis pixel lines x are calculated. However, there exist no intersections for this short straight outline segment. After the count n is increment in step S4, steps S2 and S3' are executed to calculate and store the x-coordinates of the intersections of the upper arcuate outline segment of the stroke 44 are calculated and stored. Finally, steps S2 and S3' are implemented to obtain the x-coordinates of the intersection of the left-hand side short straight outline segment of the stroke 44. No intersections of this straight outline segment exist. As in the preceding embodiment, the stored x-coordinate values are ordered from the smallest to the largest and paired in step S7.

Figure 21:
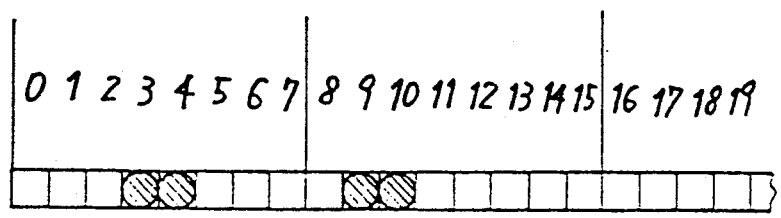
FIG. 21 is a view explaining the manner of preparing dot data according to the x-axis coordinate values of the intersections as indicated in FIG. 19.

In step S8', the x-coordinate data stored in the first COORDINATE memory 22a is converted into corresponding dot data to be stored in the first DOT DATA memory 24a. Referring to FIG. 21, there will be described the manner for processing the x-coordinate data for the x-axis pixel line x numbered "(2)" by way of example. In this case, a first pair of x-coordinate values of the first and second intersections are (3, 4), and a second pair of x-coordinate values of the third and fourth intersections are (9, 10), as a result of the ordering and pairing operation in step S7. At first, the bits corresponding to the picture elements represented by the x-coordinate values (3, 4) are set to "1". Specifically, the larger x-coordinate value (4) of the second intersection is compared with x-coordinate value "7" corresponding to the last bit of the byte to which the bit corresponding to the smaller x-coordinate value (3) of the first intersection belongs. Since the value "7" is larger than the value (4) of the second intersection, the picture elements corresponding to the first and second intersections are judged to belong to a group of picture elements which corresponds to the relevant byte of the dot data. Therefore, the bits corresponding to the x-coordinate values (3) and (4) of the first and second intersections are set to "1". Similarly, the bits corresponding to the x-coordinate values (9) and (10) of the third and fourth intersections are set to "1". In FIG. 21, hatched circles indicate the logical value "1" of the bits of the dot data.

If the larger x-coordinate value of each pair is larger than the x-coordinate value corresponding to the last bit of the relevant byte, the bits corresponding to the x-coordinate values between the smaller x-coordinate value of the pair and the x-coordinate value corresponding to the last bit are set to "1". Then, the x-coordinate value corresponding to the last bit of the relevant byte is subtracted from the larger x-coordinate value of the pair, for checking to see if there are eight picture elements corresponding to the next byte of dot data, as described above with respect to the first embodiment referring to FIG. 14.

The thus prepared batch of dot data is stored in the first DOT DATA memory 24a, whose capacity is determined to store the dot data for one character where the largest character size is selected. If the selected character size is smaller than the largest size, the dot data for a character is stored in a portion of the memory 24a.

Step S8' is followed by step S9 to determine whether the selected character size is 12-point or smaller. If the selected size is 12-point or smaller, step S10 is implemented to calculate y-coordinate values of the intersections between the arcuate stroke 44 and the y-axis pixel lines y. The rule for calculating the y-coordinate values is the same as that for the x-coordinate values. The positions of the picture elements corresponding to the calculated y-coordinate values are indicated by "*" marks in FIG. 18, which are placed on the centers of the picture elements. The y-coordinate values of the picture elements are indicated by the numbers of the x-axis pixel lines x. The calculated y-coordinate values of the intersections are stored in step S11 in the second COORDINATE memory 22b. The y-coordinate values are stored for each y-axis pixel line y which intersects any outline segment of the stroke 44, as indicated in FIG. 20. Steps S12–S16 are executed in the same manner as steps S4–S8, so that the appropriate dot data is prepared and stored in the second DOT DATA memory 24b. Like the first DOT DATA memory 24a, this memory 24b has a storage capacity for storing the dot data for one character where the largest character size is selected. After the dot data is stored in the second DOT DATA memory 24b, step S17 is executed to transfer the batches of dot data from the first and second DOT DATA memories 24a, 24b to the COMBINED DATA memory 26, such that the two batches of dot data are combined together into a batch of combined dot data, in a manner as described below. The COMBINED DATA memory 26 has a storage capacity for storing dot data for one page of text. The two batches of dot data from the two DOT DATA memories 24a, 24b are stored at appropriate locations of the COMBINED DATA memory 26 which are determined by the printing positions of the relevant character. The two batches of dot data are combined or synthesized by an inclusive-or operation to obtain a logical sum of the logical values of corresponding two bits of the two batches of dot data stored in the first and second DOT DATA memories 24a, 24b. That is, the logical value of a bit of combined dot data stored in the COMBINED DATA memory 26 is "1" where the logical value of at least one of the corresponding two bits of the two batches of dot data in the two DOT DATA memories 24a, 24b is "1". The logical value of a bit in the memory 26 is "0" only where the logical values of the corresponding two bits of dot data in the memories 24a, 24b are both "0".

In FIG. 18, the cross-hatched circles indicate dots to be printed based on the calculated x-coordinate values of the intersections between the outline of the stroke 44 and the x-axis pixel lines x. On the other hand, the hatched circles indicate dots to be printed based on the calculated y-coordinate values of the intersections between the stroke 44 and the y-axis pixel lines y. In this specific example, however, the cross-hatched circles also indicate the latter dots.

It will be understood from FIG. 18 that the dots indicated by the hatched circles would not be printed if the printing were effected based only on the dot data stored in the first DOT DATA memory 24a which is prepared from the x-coordinate data of the intersections between the stroke 44 and the x-axis pixel lines x. In this event, the printed arcuate stroke 44 is discontinuous, with its portions corresponding to the hatched circles left blank. According to the present modified embodiment, however, the intersections of the stroke 44 are obtained also with respect to the y-axis pixel lines y, and the dot data used for printing is prepared also based on the dot data which is prepared from the y-axis coordinates of the intersections between the stroke 44 and the y-axis pixel lines y. This arrangement permits the arcuate stroke 44 to be continuously formed by the printed dots indicated by the hatched circles, as well as the printed dots indicated by the cross-hatched circles. If the arcuate stroke 44 is rotated 90 degrees on the pixel screen 50, the printed stroke 44 is discontinuous if the dot data used for the printing is prepared based only on the y-coordinate data of the intersections between the stroke 44 and the y-axis pixel lines y, but is continuous if the dot data is prepared based on the x-coordinate data of the intersections between the stroke 44 and the x-axis pixel lines x.

Where the selected character size is larger than the 12-point size, an affirmative decision (YES) is obtained in step S9, and steps S10–S16 are skipped. In this case, therefore, the intersections between the stroke 44 and the y-axis pixel lines y will not be obtained, and the dot data stored in the COMBINED DATA memory 26 is prepared based only on the x-coordinate data of the intersections between the stroke 44 and the x-axis pixel lines x. This arrangement is provided in view of a general tendency that where the character size is larger than 12-point, a character is less likely to have a stroke which is so narrow that the stroke is positioned between two adjacent x-axis pixel lines x. In this case, therefore, the printed character is less likely to have discontinuous segments even if the dot data used for the printing is effected based only on the x-coordinate data. Where a negative decision (NO) is obtained in step S9, the control flow goes directly to step S17 in which the dot data stored in the first DOT DATA memory 24a is stored at the appropriate locations of the COMBINED DATA memory 26 which are determined by the printing position of the relevant character.

It will be understood from the above explanation that the x-axis pixel lines x and the y-axis pixel lines y are used as first parallel scanning lines and second parallel scanning lines for obtaining a first and a second batch of dot data stored in the first and second DOT DATA memories 24a, 24b, respectively. It will be also understood that the portion of the PROGRAM ROM 16 for step S2, and the coordinate calculating portion 38 of the CPU 12 assigned to execute step S2 cooperate to constitute first coordinate calculating means for calculating the x-coordinate data of the intersections between the character outline and the x-axis pixel lines x. Further, the first DOT DATA memory 22a and the portions of the PROGRAM ROM 16 and CPU 12 assigned to execute steps S3' and S7 cooperate to constitute first coordinate storing means for storing the x-coordinate data. The portion of the PROGRAM ROM 16 for step S8', and the data preparing portion 40 of the CPU 12 assigned to execute step S8' cooperate to constitute first dot data preparing means for preparing the first batch of dot data. It will be also understood that the portion of the PROGRAM ROM 16 for step S10, and the coordinate calculating portion 38 of the CPU 12 assigned to execute step S10 cooperate to constitute second coordinate calculating means for calculating the y-coordinate data of the intersections between the character outline and the y-axis pixel lines y. Further, the second DOT DATA memory 22b and the portions of the PROGRAM ROM 16 and CPU 12 assigned to execute steps S11 and S15 cooperate to constitute second coordinate storing means for storing the y-coordinate data. The portion of the PROGRAM ROM 16 for step S16, and the data preparing portion 40 of the CPU 12 assigned to execute step S16 cooperate to constitute second dot data preparing means for preparing the second batch of dot data. Further, the portion of the PROGRAM ROM 16 for step S17, and the dot data preparing portion 40 of the CPU 12 cooperate to constitute combined data preparing means for preparing dot data according to the contents of the first and second COORDINATE memories 24a, 24b. It will be further understood that the portions of the PROGRAM ROM 16 and CPU 12 assigned to execute step S9 constitute operation control means for enabling the second coordinate calculating means, the second coordinate storing means and the second dot data preparing means when the selected size of a character to be reproduced is smaller than a predetermined value, and disabling the second coordinate calculating means, the second coordinate storing means and the second dot data preparing means when the selected size of the character is not smaller than the predetermined value.

It is noted that the first and second batches of dot data prepared from the x-coordinate and y-coordinate data of the intersections between the character outline and the pixel lines x, y may be stored directly into the COMBINED DATA memory 26.

In the present modified embodiment, the logical value of a bit of dot data representative of a dot to be formed is "1", and consequently the inclusive-or operation is effected to combine the first and second batches of dot data. If the logical value of the bit representative of a dot to be formed is "0", the first and second batches of dot data are combined by an AND operation so as to obtain a logical product of the two batches of dot data.

It is possible that dot data is prepared based only on y-coordinate data of the intersections between the character outline and the y-axis pixel lines y, where the selected character size is larger than the 12-point size.

The outline data for each character may consist solely of coordinate data. In this case, the outline data for a character consisting of two or more straight strokes consists of sets of coordinate data representative of the coordinates of the points defining the straight strokes. If the strokes of a character includes a curved or arcuate stroke or strokes, the outline data includes sets of coordinate data representative of two or more points which are concatenated to define each curved or arcuate stroke.

It will be obvious that the present invention may apply to a printer other than a laser printer as described above, and may also apply to a device other than a printer, which requires conversion of outline data of images such as letters and graphical representations into corresponding dot data.

It will be understood that the present invention may be embodied with various other changes, modifications and improvements, which may occur to those skilled in the art.

What is claimed is:

1. A data converting apparatus for converting a batch of outline data representative of an outline of an image such as a letter, a symbol and a graphical representation, into a batch of dot data indicative of whether a dot is to be formed in each of picture elements positioned in a coordinate system in which said outline data is defined, said apparatus comprising:
    coordinate calculating means for calculating coordinate values of intersections between said outline of said image in said coordinate system and a plurality of parallel scanning lines superimposed on said outline in said coordinate system;
    coordinate storing means for storing the coordinate values calculated by said coordinate calculating means, such that the coordinate values for each of said scanning lines are arranged in order of the magnitude of the values and adjacent two of the ordered values are paired as a pair of coordinate values; and
    dot data preparing means for preparing a batch of dot data such that successive bits of the dot data corresponding to a plurality of successive picture elements which consist of two picture elements represented by said pair of coordinate values and at least one picture element between said two picture elements are set at one time such that each of said successive bits indicates a dot to be formed in the corresponding picture element.

2. A data converting apparatus according to claim 1, wherein said coordinate calculating means calculates as the coordinate value of each of said intersections between said outline of said image and said scanning lines, a coordinate value of a center of one of said picture elements which is nearest to said each intersection.

3. A data converting apparatus according to claim 2, wherein said center of said one of the picture elements which is nearest to said each intersection is located inside said outline represented by said outline data.

4. A data converting apparatus according to claim 2, wherein where a width of said image is so small that there exists only one intersection between said outline and said parallel scanning lines, whose coordinate value is calculated by said coordinate calculating means, said coordinate storing means stores the coordinate value of said one intersection, at different locations thereof, as said pair of coordinate values.

5. A data converting apparatus according to claim 1, wherein said coordinate system is divided into a plurality of divisions in a direction parallel to said scanning lines, and said dot data preparing means prepares said batch of dot data, starting with a bit corresponding to one of said pair of coordinate values, said dot data preparing means determining whether said plurality of successive picture elements include at least one group of picture elements each consisting of a predetermined number of picture elements located in a corresponding one of said divisions of said coordinate system, said dot data preparing means preparing the bits corresponding to said each group of picture elements such that the bits corresponding to said each group of picture elements indicate successive dots to be formed in the corresponding picture elements of said each group.

6. A data converting apparatus according to claim 1, wherein said apparatus constitutes a data converting portion of a laser printer in which said image is printed on a recording medium by exposing a surface of the medium to a laser beam while the laser beam is controlled according to said batch of dot data prepared by said dot data preparing means.

7. A data converting apparatus for converting a batch of outline data representative of an outline of an image such as a letter, a symbol and a graphical representation, into a batch of dot data indicative of whether a dot is to be formed in each of picture elements positioned in a coordinate system in which said outline data is defined, said apparatus comprising:
  first coordinate calculating means for calculating coordinate values of intersections between said outline of said image in said coordinate system and a plurality of first parallel scanning lines superimposed on said outline in said coordinate system;
  first coordinate storing means for storing the coordinate values calculated by said first coordinate calculating means, such that the coordinate values for each of said first scanning lines are arranged in order of the magnitude of the values and adjacent two of the ordered values are paired as a pair of coordinate values;
  first dot data preparing means for preparing a first batch of dot data such that successive bits of the dot data corresponding to a plurality of successive picture elements which consist of two picture elements represented by said pair of coordinate values and at least one picture element between said two picture elements are set at one time such that each of said successive bits indicates a dot to be formed in the corresponding picture element;
  second coordinate calculating means for calculating coordinate values of intersections between said outline of said image in said coordinate system and a plurality of parallel second scanning lines which are superimposed on said outline in said coordinate system and which intersect said first scanning lines;
  second coordinate storing means for storing the coordinate values calculated by said second coordinate calculating means, such that the coordinate values for each of said second scanning lines are arranged in order of the magnitude of the values and adjacent two of the ordered values for said each second scanning line are paired as a pair of coordinate values;
  second dot data preparing means for preparing a second batch of dot data such that successive bits of the dot data corresponding to a plurality of picture elements which consist of two picture elements represented by said pair of coordinate values for said each second scanning line and at least one picture element between said two picture elements represented by said pair of coordinate values for said each second scanning line are set at one time such that each of said successive bits of said second batch of dot data indicates a dot to be formed in the corresponding picture element; and
  combined data preparing means for preparing a batch of combined dot data by combining said first batch of dot data prepared by said first dot data preparing means and said second batch of dot data prepared by said second dot data preparing means.

8. A data converting apparatus according to claim 7, said image is a character such as a letter and a symbol which is reproduced in a selected one of a plurality of different sizes and said converting apparatus further comprising operation control means for enabling said second coordinate calculating means, said second coordinate storing means and said second dot data preparing means when the selected size is smaller than a predetermined value, and disabling said second coordinate calculating means, said second coordinate storing means and said second dot data preparing means when the selected size is not smaller than said predetermined size.

9. A data converting apparatus for converting a batch of outline data representative of an outline of an image such as a letter, a symbol and a graphical representation, into a batch of dot data indicative of whether a dot is to be formed in each of picture elements positioned in a coordinate system in which said outline data is defined, said apparatus comprising:
  coordinate calculating means for calculating coordinate values of intersections between said outline of said image in said coordinate system and a plurality of parallel scanning lines superimposed on said outline in said coordinate system, said coordinate system being divided into a plurality of divisions in a direction parallel to said scanning lines;
  coordinate storing means for storing the coordinate values calculated by said coordinate calculating means, such that the coordinate values of each of said scanning lines are arranged in order of the magnitude of the values and adjacent two of the ordered values are paired as a pair of coordinate values; and
  dot data preparing means for preparing a batch of dot data such that successive bits of the dot data corresponding to a plurality of successive picture elements which consists of two picture elements represented by said pair of coordinate values and at least one picture element between said two picture elements are set at one time such that each of said successive bits indicates a dot to be formed in the corresponding picture element,
  said dot data preparing means preparing said batch of dot data, starting with a bit corresponding to one of said pair of coordinate values, said dot data preparing means determining whether said plurality of successive picture elements include at least one group of picture elements each consisting of a predetermined number of picture elements which are located in a corresponding one of said divisions of said coordinate system, and preparing the bits corresponding to said each group of picture elements such that the bits corresponding to said each group of picture elements indicate successive dots to be formed in the corresponding picture elements of said each group.

* * * * *